United States Patent
Holopainen et al.

(10) Patent No.: US 6,500,304 B1
(45) Date of Patent: Dec. 31, 2002

(54) METHOD AND DEVICE FOR CHANGING THE NATURAL FREQUENCY OF A NIP ROLL CONSTRUCTION IN A PAPER OR BOARD MACHINE

(75) Inventors: Kari Holopainen, Muurame (FI); Juha Ehrola, Vaajokoshi (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/763,010

(22) PCT Filed: Aug. 11, 1999

(86) PCT No.: PCT/FI99/00665

§ 371 (c)(1),
(2), (4) Date: Feb. 14, 2001

(87) PCT Pub. No.: WO00/09805

PCT Pub. Date: Feb. 24, 2000

(30) Foreign Application Priority Data

Aug. 14, 1998 (FI) .................................................. 981756

(51) Int. Cl.⁷ .................................................. D21F 3/00
(52) U.S. Cl. ...................................... 162/205; 100/170
(58) Field of Search .................................. 162/198, 199, 162/252, 253, 262, 263, 272, 358.1, 358.3, 205; 100/162 B, 162 R, 163 R, 170, 35; 384/99, 100, 117, 118; 492/7, 20

(56) References Cited

U.S. PATENT DOCUMENTS

| 3,868,910 A | * | 3/1975 | Schultz ....................... 105/164 |
| 4,122,772 A | * | 10/1978 | Dahlgren .................... 101/218 |
| 4,514,887 A | * | 5/1985 | Rauf et al. ............... 29/116 AD |
| 4,910,842 A | | 3/1990 | Brendel ........................ 29/110 |
| 4,924,772 A | * | 5/1990 | Schulunke et al. .......... 100/163 |
| 5,024,150 A | | 6/1991 | Brendel et al. ................ 100/35 |
| 5,800,324 A | | 9/1998 | Schiel ............................ 492/7 |
| 5,961,899 A | * | 10/1999 | Rosetti et al. ............. 264/40.1 |
| 6,156,158 A | * | 12/2000 | Kustermann ................ 162/198 |
| 6,228,009 B1 | * | 5/2001 | Van Haag ....................... 492/7 |

FOREIGN PATENT DOCUMENTS

| EP | 0747530 | 12/1996 |
| EP | 0779394 | 6/1997 |
| FI | 892160 | 11/1989 |
| FI | 94458 | 5/1994 |
| WO | 9849394 | 11/1998 |

* cited by examiner

Primary Examiner—Steven P. Griffin
Assistant Examiner—Eric Hug
(74) Attorney, Agent, or Firm—Steinberg & Raskin, P.C.

(57) ABSTRACT

A method for changing the natural frequency of a nip roll construction in a paper or board machine. In the method, the bearing elasticity of a hydrostatic bearing element (10, 20, 30, 40) of at least one roll (1) in the nip roll construction is changed, in which connect the natural frequency of the roll (1) is also changed. The device that carries out the method comprises a pressure medium accumulator (39), which has been connected to the pressure side of a loading element (13, 23, 33) of at least one hydrostatic bearing element (10, 20, 30).

5 Claims, 2 Drawing Sheets

METHOD AND DEVICE FOR CHANGING THE NATURAL FREQUENCY OF A NIP ROLL CONSTRUCTION IN A PAPER OR BOARD MACHINE

FIELD OF THE INVENTION

The present invention relates to a method for changing the natural frequency of a nip roll construction in a paper board machine. The present invention also relates to a nip roll construction in a paper or board machine, the nip roll construction including two rolls which form the nip.

BACKGROUND OF THE INVENTION

In paper machines and in paper finishing devices, vibrations constitute quite a considerable problem, and in the present-day systems, in an attempt to achieve ever higher speeds, the problems of vibration have been manifested ever more clearly. There are several possible sources of vibration in paper machines, and some of the most important ones of these sources are rolls and cylinders, which comprise a large mass that revolves at a considerably high speed. Of course, in connection with manufacture, attempts are made to make the dimensional precision of rolls as good as possible and, moreover, the rolls are balanced in order to eliminate vibrations.

In present-day paper machines and paper finishing devices, however, ever increasing use is made, of rolls provided with soft coatings, which rolls may constitute a considerable source of vibration during operation. Such rolls are used, for example, in supercalenders, soft calenders, presses, coating devices, size presses, and equivalent, in which said roll provided with a soft coating forms a nip with another roll. Through the nip, a paper web and possibly a felt, wire or equivalent are passed. In such a nip roll solution, when a joint or splice of a wire, felt or web, considerable impurities, or something else that causes a considerable change in the thickness of the web passing through the nip runs through the nip during operation, the coating has to yield, in which case the coating acts as a spring that activates vibration. Owing to the visco-elastic properties of the coating, the coating is deformed so that it activates itself, i.e., in this case, no outside activating is needed. The deformation formed in the coating has not time to be reversed before the same point enters into the nip again, in which case the deformation is amplified and the roll starts resonating. The activated vibration itself is synchronized with a multiple of the frequency of rotation of the soft roll.

For example, in a size press and in a coating device of the type of a size press, the nip is formed by means of two rolls so that one nip roll has been mounted by means of bearing housings directly on the frame construction of said device, whereas the opposite roll has been mounted by means of its bearing housings on loading arms, which have been linked on the frame construction of the machine. In such a case, in particular, the roll mounted on loading arms starts vibrating, in which connection the coating on the soft-faced roll is deformed, as a result of which the vibration is intensified and the roll starts resonating.

One common prior-art mode of eliminating such vibrations is a change in the running speed of the machine so that, at the running speed concerned, the vibration is no longer intensified but starts being attenuated. Thus, problems of vibration have restricted the running speed of the machine.

In the applicant's FI Patent 94,458, a method and an equipment are described, by whose means the critical speed of a roll can be changed in view of prevention of vibration. The critical speed of a roll can be changed by changing the mass of the roll and/or by changing the rigidity of the suspension of the roll and/or by changing the location of the roll suspension point in the axial direction of the roll and/or by changing the elastic constant of the journalling of the roll and/or by supporting the roll from the roll face by means of a displaceable support roller.

In the applicant's FI Patent Application 971864, a method is described for attenuation of oscillation in a paper machine or in a paper finishing device by means of a dynamic attenuator, which comprises an additional weight suspended on the oscillating object by means of a spring. In the method, the oscillation frequencies of the oscillating object are measured constantly by means of one or several oscillation detectors. The measurement signals given by the oscillation detector are amplified by means of an amplifier and fed into an oscillation analyzer, which identifies the problematic excitation frequency and converts said problematic excitation frequency into a control signal. The control signal is fed into a control device, by whose means the elastic constant of the spring of the dynamic attenuator and/or the mass of the dynamic attenuator is/are changed in order to make the specific frequency of the dynamic attenuator substantially equal to the problematic excitation frequency. The dynamic attenuator may consist, for example, of a substantially horizontal bar attached to a bearing housing of the roll, an additional weight being suspended on said bar and the location of the weight on the bar being displaceable.

OBJECTS AND SUMMARY OF THE INVENTION

The method and the device in accordance with the invention are particularly well suited for use in a nip roll construction in which a roll nip is formed between a soft-faced roll and a hard-faced roll. In such constructions, rapidly increasing vibrations may arise through deformation of the coating on the soft-faced roll, and it must be possible to bring such vibrations under control.

This is accomplished in the present invention so that the elasticity of a hydrostatic bearing element of a nip roll and, thus, the resonance frequency are varied before the deformation has had time to proceed too far, in which connection the level of vibration can be kept under control. When a pressure accumulator is provided for the pressure medium of the hydrostatic bearing element, which pressure accumulator can be switched on and off, the elasticity of the bearing element can be varied.

The possibility of regulation of bearing elasticity in accordance with the present invention provides a simple mode of avoiding vibrations in rolls and, for example in calenders, of avoiding barring without having to change the process parameters.

BRIEF DESCRIPTION OF THE DRAWINGS

In the following, the invention will be described with reference to the figures in the accompanying drawings, the invention being, however, not supposed to be confined to the details of said illustrations alone.

DETAILED DESCRIPTION OF THE INVENTION

Figure 1:
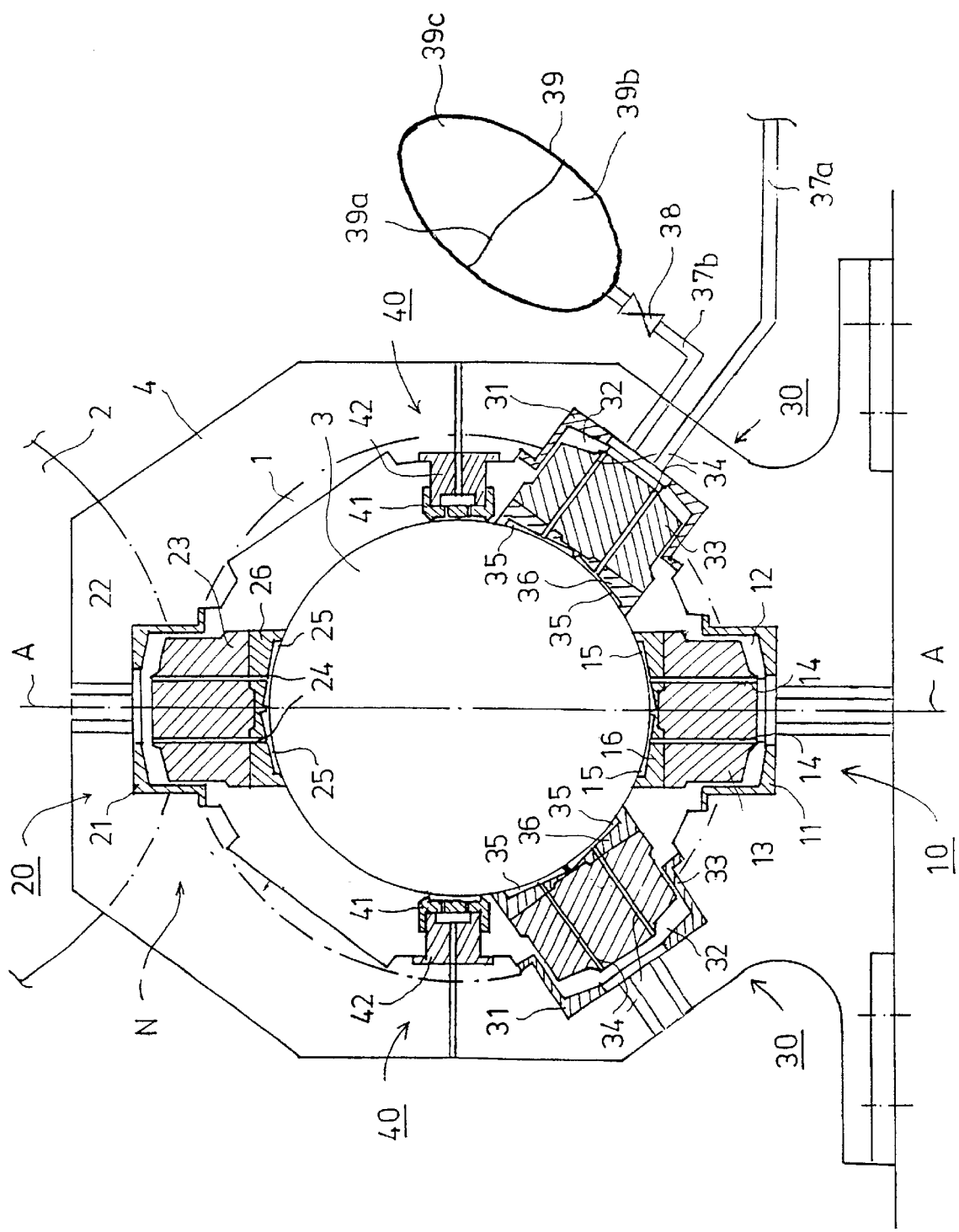
FIG. 1 is a schematic illustration of a hydrostatic glide bearing arrangement of a roll in a paper machine, to which the method and the device in accordance with the present invention can be applied.

FIG. 1 is a schematic illustration of a hydrostatic glide bearing arrangement of a roll in a paper machine, to which the method and the device in accordance with the invention can be applied. The roll itself is illustrated by a dashed-dotted line and denoted with the reference numeral 1, and the roll axle is denoted with the reference numeral 3. The reference numeral 2 represents the backup roll, which forms a nip N with the roll 1, which nip is, for example, a calendering nip. The nip plane is denoted with the reference A—A. The bearing system of at least one end of the roll 1 must also include an axial bearing that receives axial loads, because the glide bearing arrangement is supposed to operate primarily exclusively as a radial bearing of the roll.

The glide bearing arrangement shown in FIG. 1 consists of bearing elements 10,20, 30,40, which have been mounted in a bearing block 4 and which rest against the roll axle 3. The bearing arrangement comprises a main bearing 10,30, which is effective in the principal loading direction, i.e. in the direction of the nip plane A—A, and which is loaded towards the nip N, a backup bearing 20 acting in the opposite direction, and side bearings 40, which act in opposite directions in the direction transverse to the nip plane A—A. Here the main bearing has been divided into three parts, so that it comprises a first bearing element 10 acting in the nip plane and, moreover, second bearing elements 30, which have been fitted at an angle in relation to the nip plane and which are placed symmetrically.

Here the first bearing element 10 and the second bearing elements 30 are of equal construction, as compared with each other. They comprise a cylinder 11,31 mounted in the bearing block 4, in which cylinder a loading piston 13,33 has been fitted mobile. Below the loading piston 13,33, a pressure space 12,32 is formed in the cylinder 11,31, the loading piston 13,33 being loaded towards the axle 3 so that pressure medium is passed into said pressure space. To the end of the loading piston 13,33 placed towards the axle 3, a bearing shoe 16,36 has been attached, onto which lubricant pockets 15,35 opening towards the axle 3 have been formed. Into the loading piston 13,33, through capillary bores 14,34 have been formed, which thus connect the pressure space 12,32 in the cylinder with the lubricant pockets 15,35 provided on the bearing shoe. Thus, through the capillary bores 14,34, the pressure medium has access to the lubricant pockets 15,35 so that a fluid film is formed between the bearing shoe 16,36 and the axle 3, by whose intermediate the bearing shoe 16,36 rests against the axle 3.

The construction of the backup bearing 20 is similar to the bearing elements 10,30 of the main bearing, so that the backup bearing element 20 consists of a cylinder 21 mounted in the bearing block 4 and of a loading piston 23 fitted displaceably in the cylinder. The loading piston 23 is further provided with a bearing shoe 26, onto which lubricant pockets 25 have been formed. Into the bearing shoe 26, capillary bores 24 have been formed, through which oil has access from the pressure space 22 of the cylinder, placed below the loading piston 23, to the lubricant pockets 25 so as to form a fluid film between the bearing shoe 26 and the neck of the axle 3. The backup bearing element 20 has been installed in the nip plane A—A so that its acting direction is parallel to the nip plane but opposite to the acting direction of the main bearing 10,30.

The axle 3 is further supported by means of side bearings 40 acting in the direction transverse to the nip plane A—A. The side bearings 40 consist of body pieces 42 mounted in the bearing block 4 and of bearing shoes 41 fitted on the body pieces. By means of a pressure medium, the bearing shoes 41 are loaded against the roll axle 3. The function proper of the side bearings 40 is exclusively to keep the axle 3 in its correct position a and to attenuate vibrations in the cross direction.

The volumes of pressure medium placed below the pistons 13,23,33 in the bearing elements 10,20,30 are, naturally, quite little, in which case the system becomes rigid. This is why the capacity of a glide bearing to attenuate vibrations transferred from the roll axle 3 to the bearing elements 10,20,30 is relatively little.

In the invention, the elasticity of the glide bearing is increased by means of a pressure accumulator 39 communicating with the pressure spaces 12,22,32 placed below the pistons 13,23,33 of the glide bearings. The pressure accumulator 39 has been divided into two parts 39b,39c by means of a membrane 39a, in which case, at one side of the membrane 39a, there is air or nitrogen, and at the opposite side of the membrane 39a there is the pressure medium of the glide bearing. Variation of the elastic constant of the glide bearing by means of the pressure accumulator 39 is based on the fact that the compressibility of the air or nitrogen volume placed behind the membrane 39a in the pressure accumulator 39 is considerably higher than the compressibility of an oil placed in a closed space.

In FIG. 1, in connection with one of the bearing elements 30 of the main bearing, placed at the right side, a pressure accumulator 39 in accordance with the invention is shown, by whose means the volume of the pressure space 32 placed below the piston 33 can be increased. The pressure accumulator 39 communicates with the pressure space 32 placed below the piston 33 through a valve 38 and a pipe 37b. A second pipe 37a passing into the pressure space 32 has been connected to a source that feeds the pressure medium (not shown in the figure). The pressure accumulator 39 has been divided into two compartments by means of a membrane 39a. In the compartment 39b of the pressure accumulator 39 which is placed next to the valve 38, there is pressure medium, and in the other compartment 39c there is air or nitrogen. By opening and closing the valve 38, the pressure accumulator 39 can be switched on and off. By means of variation of the pre-filling pressure of the pressure accumulator 39, it i s possible e to act upon the elasticity of the glide bearing.

If the pre-filling pressure of the pressure accumulator 39 is lower than the pressure of the pressure medium that is fed into the pressure space 32 placed below the piston 33 of the glide bearing 30, the pressure accumulator 39 is filled with the pressure medium fed to the bearing 30 up to the point at which the pressure of the air or nitrogen present behind the membrane 39a of the pressure accumulator 39 equals the pressure of the pressure medium fed to the bearing. The pressure accumulator 39 has maximal elasticity in a situation in which the pressure medium of the glide bearing 30 fills about one half of the total volume of the pressure accumulator 39.

If the pre-filling pressure of the pressure accumulator 39 is 0 bar, the pressure accumulator 39 is filled completely with the pressure medium that is fed to the glide bearing 30. In such a case, the elasticity of the glide bearing 30 is determined exclusively in compliance with the fluid volume placed below the piston 33 of the glide bearing 30 and in the pressure accumulator 39 and in the pipe system.

If the pre-filling pressure of the pressure accumulator 39 is higher than the pressure of the pressure medium fed into the pressure space 32 below the piston 33 of the glide bearing 30, the higher elasticity of the pressure accumulator 39 does not start acting until in a situation of vibration in which the pressure peaks acting upon the pressure medium placed below 32 the piston 33 of the glide bearing 30 are higher than the pre-filling pressure. The pressure peaks arise when the axle of a vibrating roll presses the bearing element 10,20,30 towards the bearing housing.

In FIG. 1, a pressure accumulator 39 is shown in connection with the bearing element 30 placed to the right only, but a similar pressure accumulator 39 can, of course, be connected with each bearing element 10,20,30 of the main bearing.

To the bearing elements 10 and 30 placed in the bottom portion of the main bearing in FIG. 1, pressure medium is often fed from one common pressure line. In such a case, the pressure chambers 12,32 of the pistons 13,33 in the bearing elements 10, 30 communicate with each other, in which case these bearing elements 10,30 can be connected to one common pressure accumulator.

When the elasticity of the pressure medium placed below the pistons 13,23,33 in the main bearing 10,20,30 is changed, at the same time the natural frequency of the roll supported by means of the glide bearing is also changed.

Figure 2:
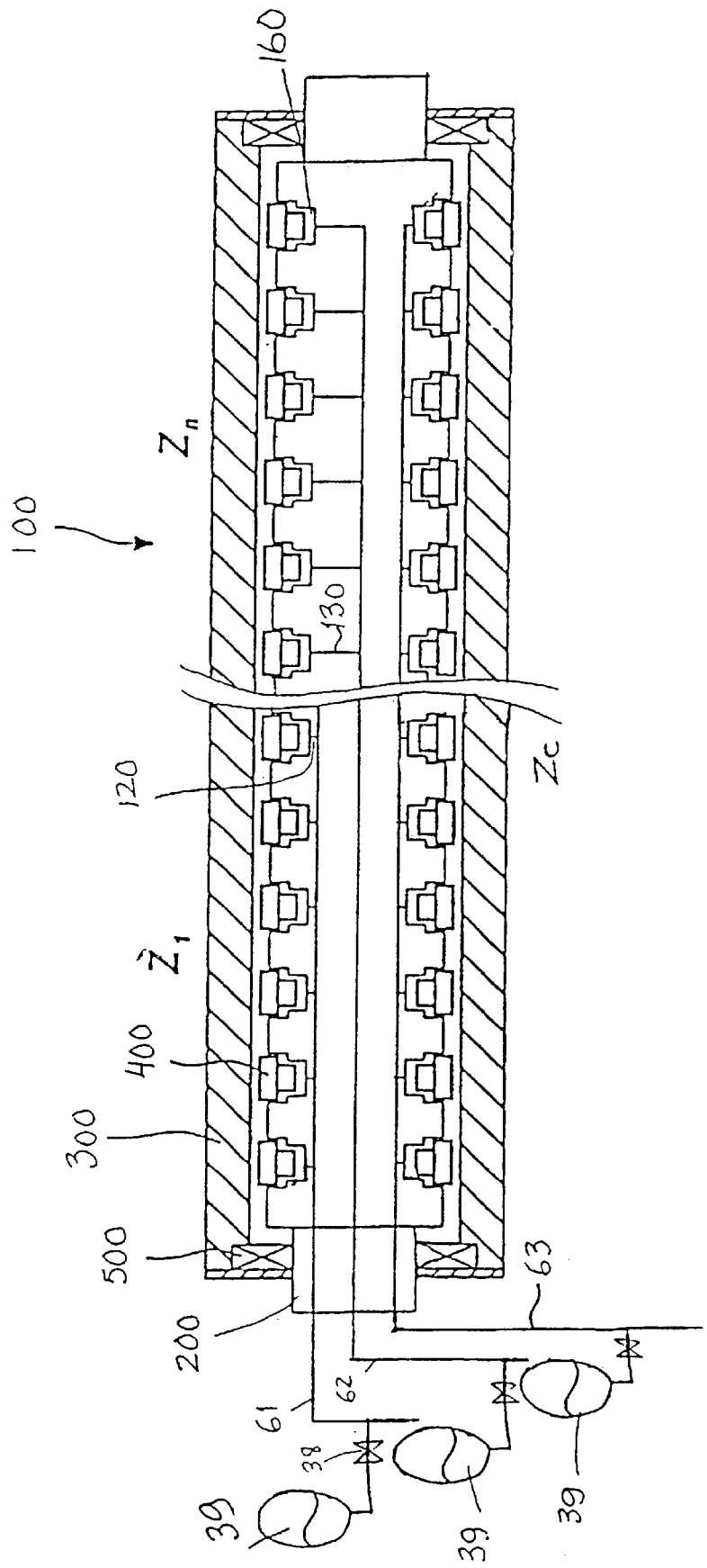
FIG. 2 illustrates an embodiment of the solution in accordance with the invention as applied in connection with a variable-crown roll.

FIG. 2 is a schematic illustration of an embodiment of the solution in accordance with the present invention as applied in connection with a variable-crown roll.

The variable-crown roll 100 shown in FIG. 2 comprises a roll mantle 300 arranged revolving around a stationary axle 200. The roll mantle 300 is supported on the axle 200 by means of hydrostatic bearing elements 400, by whose means the roll 100 can be loaded, for example, against a backup roll (not shown). In view of regulation of the nip profile, the roll mantle 300 has been divided, in the axial direction, into regulation zones $Z_1 \ldots Z_n$, whose number is, for example, $1 \ldots 10$, typically 8. In such a case, each regulation zone comprises a number of bearing elements 400 subjected to the same pressure. The regulation in zones can also be accomplished so that each hydrostatic bearing element 400 forms a "zone" of its own, in which case the pressure of each bearing element 400 can be regulated separately, and in this case the number of the regulation zones can be, for example, even higher than 60. The pressure medium is passed to the bearing elements 400 so that, for each zone $Z_1, Z_n$, there is a feed line 61,62 of its own, from which line a duct 120,130 passing into the pressure space 160 of each bearing element 400 departs. In accordance with the present invention, the rigidity of the roll can be regulated so that the oil volume in the pressure space 160 is changed elastically by means of a pressure accumulator 39 in analogy with the solution shown in FIG. 1. A pressure accumulator 39 can be fitted in one or several pressure lines 61,62 passing to the zones, in which case the rigidity of the roll can be affected on the level of a zone. In the case of a roll with glide bearings, the hydrostatic bearing elements (not shown) which support the end of the roll mantle, whose number in the radial direction is typically $4 \ldots 12$, depending on the size of the roll, form a "zone" of their own, in whose connection it is preferable to connect a pressure accumulator of its own. Of course, each bearing element in the glide bearing arrangement can be provided with a pressure accumulator separately. If the variable-crown roll is provided with a backup zone $Z_c$, which extends over the entire axial length of the roll in the figure, but which can also be shorter, the pressure line 63 of said backup zone can also be provided with a pressure accumulator 39.

In the following, the patent claims will be given, and the details of the invention can show variation within the scope of the inventive idea defined in said claims and differ from what has been stated above by way of example only.

What is claimed is:

1. A nip roll construction in a paper or board machine, comprising:
    at least two rolls (1,100,2), structured and arranged to form a nip (N) between one another, of which at least two rolls at least one roll (1,100) comprises at least one hydrostatic bearing element (10,20,30,40,400) supporting a rotating axle (3) or a rotating mantle (300) of said at least one roll (1,100); and
    a pressure accumulator (39), which has been connected through a valve (38) to a pressure side of at least one loading element (13,23,33) of said at least one hydrostatic bearing element (10,20,30,40,400), by means of which pressure accumulator and valve a bearing elasticity of said at least one hydrostatic bearing element is changed actively during operation to thereby actively control a natural frequency of said at least one roll.

2. A nip roll construction in a paper or board machine, comprising:
    at least a first roll;
    at least a second roll structured and arranged proximate said first roll thereby defining a nip between said first and second roll;
    at least one hydrostatic bearing element having a contact end structured and arranged to support said at least one bearing element supporting a rotating axle (3) or a rotating mantle of said at least one of said first and second rolls, and said at least one bearing element having a pressure end comprising a loading element structured and arranged for transmitting and receiving a pressure medium to and from said hydrostatic bearing element;
    a pressure accumulator operatively coupled to said loading element via a valve, whereby said pressure accumulator and said loading element actively change a bearing elasticity of said hydrostatic bearing element to thereby actively control a natural frequency of said at least one roll.

3. The nip construction according to claim 2, wherein said hydrostatic bearing members comprise:
    a bearing block for mounting said hydrostatic bearing members;
    a cylinder mounted to said bearing block;
    a movable loading piston structured and arranged within said cylinder having a first end and a second end, wherein a pressure space is defined between said first end of said piston and said cylinder, whereby said pressure space being structured and arranged for receiving said pressure medium therein;
    a bearing shoe coupled to said second end of said piston and in contact with one of said first and second rolls.

4. The nip roll construction according to claim 3, wherein said pressure accumulator comprises:
    a first and second compartment separated by a membrane; said first compartment being operatively coupled to said valve and structured and arranged for receiving and transmitting said pressure medium therefrom, said second compartment being structured and arranged for retaining a fluid having a compressibility ratio higher than the compressibility ratio of said pressure medium therein.

5. A method for changing the natural frequency of a nip roll construction in a paper or board machine, comprising the steps of:
    providing a nip roll having at least a first and at least a second roll defining a nip between said first and second roll;

providing a hydrostatic bearing element on at least one of said first and second rolls;

actively changing a bearing elasticity of said hydrostatic bearing element during operation of said paper or board machine, wherein a natural frequency of said roll provided with said hydrostatic bearing element is changed;

providing a pressure accumulator operatively coupled to a pressure side of at least one loading element of said hydrostatic bearing element; and actively changing said bearing elasticity of said hydrostatic bearing element during operation of said paper or board machine via said pressure accumulator.

* * * * *